United States Patent

[11] 3,529,554

[72] Inventors Magnus Emamuel Tillander;
Ake Berhard Persson, Vallingby; Leif A. T. Johansson, Huddinge, Sweden
[21] Appl. No. 740,642
[22] Filed June 27, 1968
[45] Patented Sept. 22, 1970
[73] Assignee Ti-Pe Elmeko, Tillander & Persson,
Stockholm, Sweden,
a partnership of Sweden
[32] Priority June 30, 1967
[33] Sweden
[31] 10,118/67

[54] DISCONTINUOUS BAKING OVEN
3 Claims, 4 Drawing Figs.
[52] U.S. Cl. ................................................ 107/55, 34/199
[51] Int. Cl. ........................................... A21b 1/26

[50] Field of Search ........................................ 107/55, 56, 63; 25/155.5; 34/222, 199, 191

[56] References Cited
UNITED STATES PATENTS
2,002,976 5/1935 Byron .......................... 107/55
2,767,667 10/1956 Spooner ....................... 107/55X

*Primary Examiner*—Walter A. Scheel
*Assistant Examiner*—Robert I. Smith
*Attorney*—McGlew and Toren ABSTRACT: A discontinuous convection baking oven comprising a normally closed baking chamber through which in operation heated air is forced to flow horizontally between two opposed side walls having a plurality of passages for the air. Means are provided for sweeping the separate jets of air entering the baking chamber through the passages back and forth in the baking chamber so that a uniform baking of the stationary goods in the baking chamber is effected.

INVENTORS
MAGNUS E. TILLANDER
AKE B. PERSSON
LEIF A. T. JOHANSSON

BY McGlew and Toren
ATTORNEYS

DISCONTINUOUS BAKING OVEN

This invention relates to discontinuous convection baking ovens, particularly rack-type convection baking ovens, that is batch-charged baking ovens in which the baking is effected by flowing heated air which is caused to touch the baking goods in a normally closed baking chamber.

Since in baking ovens of this type the baking goods is stationary during the baking it is necessary to provide for a uniform heat distribution in the baking chamber in order that a uniformly baked product may be obtained. In revolving or travelling ovens the heat distribution is not critical to the same extent since in such ovens the baking goods is continuously moved in the baking chamber whereby an equalization of the effects of a non-uniform heat distribution in the baking chamber is achieved.

The primary object of the present invention is to provide a discontinuous convection baking oven having novel and improved means for effecting a substantially uniform heat distribution in the baking chamber.

According to the invention there is provided a discontinuous convection baking oven in which at least one side wall of the baking chamber is provided with nozzle means for directing a plurality of separate air jets into the baking chamber and in which means is provided for sweeping the air jets back and forth in unison in the baking chamber.

For a better understanding of the invention, reference is made to the following detailed description of exemplary embodiments thereof, and to the accompanying schematic drawings in which.

Figure 1:
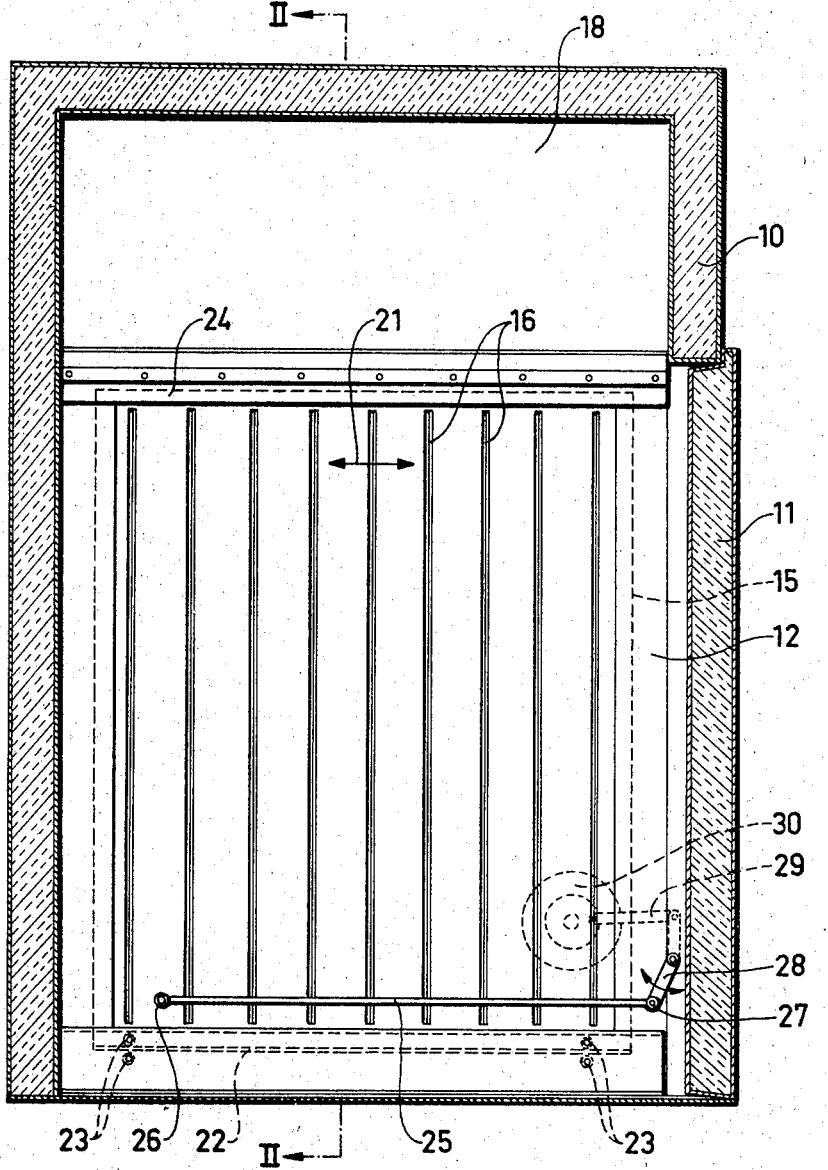
FIG. 1 is a longitudinal section of a baking oven constructed according to the invention.
Figure 2:
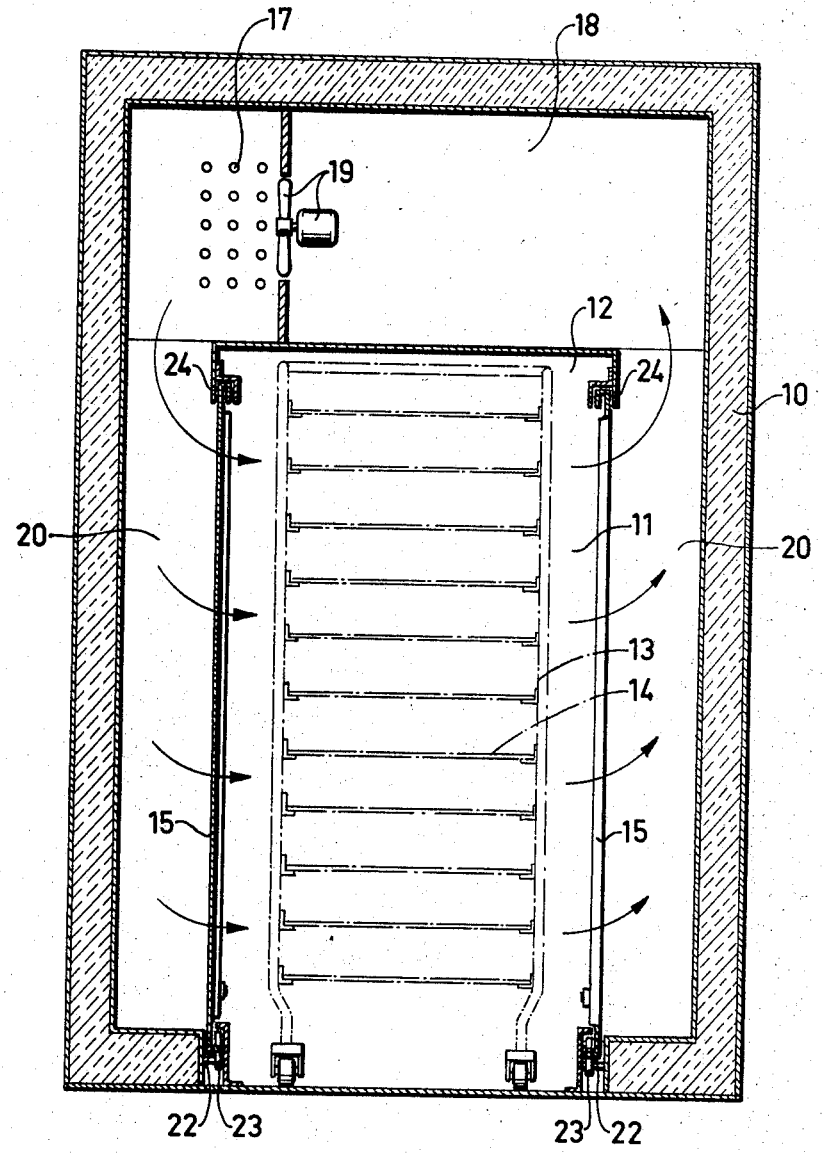
FIG. 2 is a transverse section on line II—II in FIG. 1.

Referring to the drawings, more particulary FIGS. 1 and 2, there is shown a discontinuous baking oven including a thermally insulated housing 10 having a front door 11. Inside the housing is a parallelepipedal baking chamber 12 which is accessible through the door 11 and serves to receive a rack or truck 13 (FIG. 2) having superposed baking plates or trays 14 for the goods to be baked. The sides of the baking chamber 12 are defined by side walls 15 having a plurality of spaced vertical slots 16 therethrough.

The baking of the goods on the baking plates 14 is effected by circulating heated air which is forced to flow substantially horizontally through the baking chamber 12 between the opposed side walls 15. The circulating air is heated and moistened in an air conditioning assembly which is diagrammatically indicated at 17 and located in a space 18 above the baking chamber 12. The space 18 also houses a fan 19 for circulating the air and means (not shown) for reversing the direction of flow of the air at suitable intervals. The equipment located in the space 18 forms no part of the present invention, and since the invention can be well understood without a detailed description of such equipment, it is deemed unnecessary to show it in detail in the drawings. An exemplary embodiment of the said equipment is described in U.S. Pat. No. 3,351,025, owned by the assignee of the present invention.

The heated air flows from the space 18 into a vertical passage 20 outside one side wall 15, through the slots 16 of the side wall 15 into and through baking chamber 12 and then through the slots of the opposite side wall 15 and into a similar vertical passage 20 and finally back to the space 18. The vertical passages 20 are substantially coextensive with the side walls 15 and are provided with deflectors and other means (not shown) for effecting a uniform distribution of the air over the entire surface of the side walls 15.

The structure described so far is conventional. According to the invention the side walls 15 are provided with means for moving the several separate jets or screens of air entering the baking chamber 12 through the slots 16 with respect to the stationary rack 13 whereby a uniform heat distribution to the goods being baked is effected. In the embodiment shown in FIGS. 1 and 2 the side walls 15 are bodily reciprocable in their own planes and perpendicularly to the longitudinal direction of the slots 16, i.e. horizontally, as indicated by a double arrow 21 in FIG. 1. To this end the lower edges of the side walls 15 are provided with horizontally extending flanges 22 engaging between rotatable guide and support rollers 23 having horizontal axes. The upper edges of the side walls 15 are slidably received in guides 24. A reciprocatory motion is imparted to the side walls 15 by means of a connecting rod 25 one end of which is pivotally connected at 26 to one side wall 15 and the other end of which is pivotally connected at 27 to one end of a rocker lever 28. A rocking motion is imparted to the rocker lever 28 by means of a crank mechanism 29 operated by an electric motor 30 (FIG. 1). The side walls are preferably connected with each other so as to reciprocate in unison but they may also be reciprocated independently of each other.

As a result of the reciprocatory motion of the side walls 15 the separate vertical screens of air entering the baking chamber 12 through the slots 16 sweep back and forth over the goods being baked whereby a uniform baking is obtained. The longitudinal distance swept by each screen need not substantially exceed the spacing of the slots 16.

As mentioned above the oven shown in FIGS. 1 and 2 is provided with means for reversing the air flow through the baking chamber and accordingly both side walls 15 are reciprocated during the baking. As will be readily understood, in ovens in which the air is circulated only in one direction it is sufficient to reciprocate the side wall through which the air enters the baking chamber while the other side wall may be stationary. Moreover, the side walls need not necessarily be provided with vertical slots for passing the air into the baking chamber as shown in the drawings; if desired they can instead be provided with a multiplicity of relatively small perforations.

Figure 3:
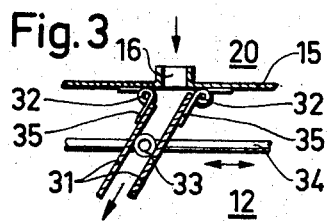
FIG. 3 and FIG. 4 are fragmentary horizontal sections of modifications of the air inlet means of the side walls of the baking chamber.

FIG. 3 is a view in horizontal section of a modification of the means for moving the air screens with respect to the stationary goods to be baked in the baking chamber 12. For the sake of simplicity only a small fraction of one side wall 15 and the adjacent portions of the baking chamber 12 and the vertical passage 20 are shown, it being understood that the side wall 15 is provided with several sets of the single structure shown in the figure.

In this case the side walls 15, which are provided with a plurality of vertical slots 16 as in the embodiment shown in FIGS. 1 and 2, are stationary. With each slot 16 there is associated a nozzle provided by a pair of flat, parallel, spaced, vertically extending flaps 31 which are hinged at one of their vertical edges, as at 32, to the side wall 15 adjacent respective ones of the edges of the slot 16 and project into the baking chamber 12. The flaps 31 are maintained in spaced-apart relation by a roller 33 which is rotatable about a vertical axis and mounted on a horizontal connecting rod 34. The connecting rod 34, which is common to all pairs of flaps of one side wall 15 and extends in parallel with the latter, is reciprocated during the baking by a suitable mechanism (not shown). The flaps 31 are maintained in engagement with the roller 33 by springs 35.

As a result of the reciprocatory motion of the connecting rod 34 the nozzles formed by the flaps 31 and accordingly the vertical screens of air entering the baking chamber 12 from the vertical passage 20 and from between the flaps 31 are swept back and forth with respect to the stationary goods to be baked in the baking chamber.

Figure 4:
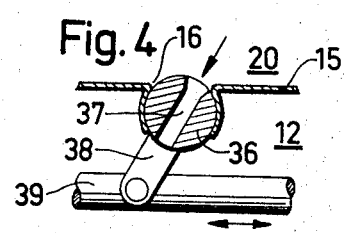

FIG. 4 is a horizontal sectional view similar to FIG. 3 and shows a further modification of the means for moving the air screens with respect to the stationary goods to be baked. This modification differs from that shown in FIG. 3 in that each nozzle formed by a pair of flaps 31 is replaced by a vertically extending rod 36 having circular cross-section and having a vertically extending slot 37 therethrough. The rod 36 is sealingly disposed in the slot 16 of the side wall 15 and is rotatable back and forth therein about a vertical axis. One end of the rod 36 is provided with a horizontal arm 38 which is pivotally connected to a reciprocating connecting rod 39 similar to the connecting rod 34 shown in FIG. 3. The operation of this modification is the same as that of the modification shown in FIG. 3.

In the modifications shown in FIGS. 3 and 4 the nozzles and their operating means are provided on the side of the side wall 15 facing the baking chamber 12, but as will be readily understood the nozzles and their operating means may as well be provided on the opposite side of the side wall. Thus, it will be understood that the invention may be embodied otherwise than herein illustrated or described, and that certain changes in the form and arrangement of parts may be made within the scope of the appended claims.

We claim:

1. A discontinuous baking oven comprising a normally closed, substantially parallelepipedal baking chamber for receiving goods to be baked, means for forcing heated air to flow substantially horizontally through the baking chamber between opposed sides thereof and touch the goods to be baked, wall means defining said opposed sides of the baking chamber, air inlet means on the wall means for providing a plurality of separate jets of said air entering the baking chamber, and means for causing the air inlet means to sweep said separate jets in unison back and forth in the baking chamber.

2. A discontinuous baking oven as set forth in claim 1 wherein the wall means has a plurality of vertical slots therethrough and wherein means is provided for horizontally reciprocating the wall means in parallel with said opposed sides.

3. A discontinuous baking oven as set forth in claim 1 wherein the wall means has a plurality of vertical slots therethrough, wherein there is associated with each slot a nozzle for providing a vertical screen of air entering the baking chamber, and wherein means is provided for rocking the nozzles in unison about vertical axes.